(12) United States Patent
Hundeshagen et al.

(10) Patent No.: US 11,767,935 B2
(45) Date of Patent: Sep. 26, 2023

(54) CONNECTING ELEMENT AND PIPE CONNECTION COMPRISING THE SAME

(71) Applicants: REHAU Construction LLC., Leesburg, VA (US); REHAU AG + Co, Rehau (DE)

(72) Inventors: Dörte Hundeshagen, Bubenreuth (DE); Thomas Schaaf, Höchstadt a.d. Aisch (DE); Hansi Homburg, Höchstadt a.d. Aisch (DE); Oliver Vocks, Fürth (DE); Andreas Kirchberger, Herzogenaurach (DE)

(73) Assignee: REHAU Construction LLC, Leesburg, VA (US)

( * ) Notice: Subject to any disclaimer, the term of this patent is extended or adjusted under 35 U.S.C. 154(b) by 412 days.

(21) Appl. No.: 16/063,844

(22) PCT Filed: Dec. 19, 2016

(86) PCT No.: PCT/EP2016/002130
§ 371 (c)(1),
(2) Date: Jun. 19, 2018

(87) PCT Pub. No.: WO2017/108169
PCT Pub. Date: Jun. 29, 2017

(65) Prior Publication Data
US 2018/0372248 A1   Dec. 27, 2018

(30) Foreign Application Priority Data

Dec. 21, 2015  (DE) .................... 20 2015 106 954.5

(51) Int. Cl.
*F16L 33/22* (2006.01)
*F16L 13/14* (2006.01)
*F16L 47/22* (2006.01)

(52) U.S. Cl.
CPC ........... *F16L 13/146* (2013.01); *F16L 33/225* (2013.01); *F16L 47/22* (2013.01)

(58) Field of Classification Search
CPC ..... F16L 13/146; F16L 33/225; F16L 33/207; F16L 33/2071; F16L 33/20; F16L 33/2076
(Continued)

(56) References Cited

U.S. PATENT DOCUMENTS 2,121,624 A * 6/1938 Cowles ............... F16L 33/2076
29/508
2,341,003 A * 2/1944 Cyril ................... F16L 33/2076
285/259
(Continued)

FOREIGN PATENT DOCUMENTS

DE         853232 C  * 10/1952  .......... F16L 33/2076
DE        3836124 A1 *  5/1990  .......... F16L 33/2076
(Continued)

OTHER PUBLICATIONS

Office action in Canadian App. No. 3,009,436 dated Mar. 26, 2019.
(Continued)

*Primary Examiner* — Matthew Troutman
*Assistant Examiner* — Fannie C Kee
(74) *Attorney, Agent, or Firm* — FITCH, EVEN, TABIN & FLANNERY, LLP

(57) ABSTRACT

A connecting element produces a pipe connection between the connecting element and a plastic pipe or a metal-plastic composite pipe by using axial pressing technology. The connecting element has at least one support body provided with circumferential external ribs for press-fitting an expanded end of the pipe onto, and includes at least one circumferential collar, wherein the connecting element between the circumferential collar and the nearest circum-
(Continued)

ferential external rib to the circumferential collar includes a pre-stop for limiting the sliding onto of the expanded end of the pipe. The distance between the edge of the pre-stop facing the circumferential external ribs and the edge of the circumferential collar facing the pre-stop is 0.10 times to 0.30 times the length of the support body. A pipe connection between an expanded end of an all-plastic pipe or of a plastic composite pipe and a connecting element includes an expanded end of an all-plastic pipe or of a plastic composite pipe; and the above-described connecting element.

8 Claims, 2 Drawing Sheets

(58) Field of Classification Search
USPC .................................................... 285/382.7
See application file for complete search history.

(56) References Cited

U.S. PATENT DOCUMENTS

| | | | | |
|---|---|---|---|---|
| 3,073,628 | A * | 1/1963 | Cline | F16L 33/207 285/259 |
| 3,224,794 | A * | 12/1965 | Crissy | F16L 33/2076 285/259 |
| 3,262,721 | A | 6/1966 | Knight | |
| 4,114,930 | A * | 9/1978 | Perkins | F16L 13/146 285/334.5 |
| 4,212,487 | A * | 7/1980 | Jones | F16L 33/225 285/259 |
| 4,305,608 | A * | 12/1981 | Stuemky | F16L 33/2076 285/259 |
| 4,367,889 | A * | 1/1983 | Redl | E21B 35/00 285/222.2 |
| 4,544,187 | A * | 10/1985 | Smith | F16L 33/2078 285/256 |
| 4,603,888 | A * | 8/1986 | Goodall | F16L 33/2076 285/148.13 |
| 4,635,972 | A | 1/1987 | Lyall | |
| 4,773,452 | A | 9/1988 | Dotti | |
| 4,817,997 | A | 4/1989 | Ingram | |
| 5,105,854 | A * | 4/1992 | Cole | F16L 33/2076 138/109 |
| 5,181,752 | A | 1/1993 | Benson et al. | |
| 5,358,012 | A * | 10/1994 | Kish | F16L 33/2076 138/140 |
| 5,508,475 | A * | 4/1996 | Profiri | F16L 33/2076 174/75 C |
| 5,577,777 | A | 11/1996 | Singh | |
| 5,853,202 | A | 12/1998 | Li | |
| 6,155,302 | A | 12/2000 | Fischerkeller | |
| 6,270,126 | B1 * | 8/2001 | Juedes | B21D 15/06 285/246 |
| 6,394,506 | B1 * | 5/2002 | Street | F16L 33/2076 285/256 |
| 6,439,617 | B1 | 8/2002 | Boer | |
| 6,619,698 | B2 * | 9/2003 | Juedes | B21D 15/10 285/246 |
| 6,715,800 | B1 | 4/2004 | Hennig | |
| 6,860,521 | B2 * | 3/2005 | Berg | F16L 33/2076 285/242 |
| 7,163,238 | B1 | 1/2007 | Mittersteiner | |
| 7,922,213 | B2 | 4/2011 | Werth | |
| 8,647,300 | B2 * | 2/2014 | Kunzler | A61M 39/1011 604/110 |
| 8,678,443 | B2 | 3/2014 | Bonhag | |
| 8,783,732 | B2 * | 7/2014 | Smith | F16L 33/01 285/259 |
| 9,038,259 | B2 * | 5/2015 | Wells | F16L 33/01 29/450 |
| 9,410,649 | B2 * | 8/2016 | Wells | F16L 25/01 |
| 10,539,258 | B2 * | 1/2020 | Wells | F16L 33/01 |
| 2002/0063424 | A1 | 5/2002 | Gennasio | |
| 2005/0012328 | A1 * | 1/2005 | Baving | F16L 37/0925 285/242 |
| 2007/0096461 | A1 * | 5/2007 | Owens | F16L 33/2076 285/256 |
| 2009/0152864 | A1 | 6/2009 | Olinger et al. | |
| 2010/0007325 | A1 * | 1/2010 | Stark | G01N 27/20 324/71.1 |
| 2010/0187815 | A1 * | 7/2010 | Theberath | F16L 33/2076 285/256 |
| 2011/0109084 | A1 | 5/2011 | Bonhag et al. | |
| 2012/0200082 | A1 * | 8/2012 | Liang | F16L 33/2076 285/371 |
| 2012/0248759 | A1 | 10/2012 | Feith | |
| 2014/0138944 | A1 * | 5/2014 | Kury | F16L 33/2076 285/239 |
| 2014/0300101 | A1 | 10/2014 | Bobenhausen | |
| 2016/0186904 | A1 | 6/2016 | Marchand | |
| 2017/0138518 | A1 | 5/2017 | Blake | |
| 2018/0372251 | A1 | 12/2018 | Schilling | |

FOREIGN PATENT DOCUMENTS

| | | | | |
|---|---|---|---|---|
| DE | 3921443 | A1 * | 1/1991 | ............. F16L 33/23 |
| DE | 9402909 | U1 | 8/1994 | |
| DE | 19841155 | C1 | 1/2000 | |
| DE | 19956000 | C1 | 1/2001 | |
| DE | 101 30 858 | A1 | 1/2003 | |
| DE | 202006001908 | U1 | 4/2006 | |
| DE | 102007006816 | A1 * | 8/2007 | ............ F16L 13/141 |
| DE | 202008008554 | U1 | 11/2009 | |
| DE | 102008024360 | A1 | 12/2009 | |
| EP | 0003142 | A2 * | 7/1979 | .......... F16L 33/2076 |
| EP | 0204445 | A1 | 12/1986 | |
| EP | 0539844 | A1 | 5/1993 | |
| FR | 905791 | A * | 12/1945 | .......... F16L 33/2076 |
| FR | 2728050 | A1 | 6/1996 | |
| FR | 2780764 | A1 * | 1/2000 | .......... F16L 33/2076 |
| JP | H08326974 | A | 12/1996 | |
| WO | WO-2013172138 | A1 * | 11/2013 | .......... F16L 33/2076 |

OTHER PUBLICATIONS

International Search Report for PCT/EP2016/002132, dated Mar. 7, 2017; English Translation submitted herewith 7 pages).
Office action in Canadian App. No. 3,009,415 dated Apr. 2, 2019.
International Search Report for PCT/EP2016/002130, dated Mar. 16, 2017; English Translation submitted herewith (8 pages).
Office action dated May 13, 2022 in Mexican App. No. MX/a/2018/007644.

* cited by examiner

CONNECTING ELEMENT AND PIPE CONNECTION COMPRISING THE SAME

CROSS-REFERENCE TO RELATED APPLICATIONS

This application is a U.S. national phase application filed under 35 U.S.C. § 371 of International Application No. PCT/EP2016/002130, filed Dec. 19, 2016, designating the United States, which claims priority from German Patent Application No. 20 2015 106 954.5 filed Dec. 21, 2015, which are hereby incorporated herein by reference in their entirety.

BACKGROUND OF THE INVENTION

The present invention relates to a connecting element for producing a pipe connection between the connecting element and a plastic pipe or a metal-plastic composite pipe by using axial pressing technology, wherein the connecting element has at least one support body provided with circumferential external ribs for press-fitting an expanded end of the pipe onto, and comprises at least one circumferential collar. Furthermore, the present invention relates to a pipe connection between an expanded end of an all-plastic pipe or of a plastic composite pipe and a connecting element, wherein the pipe connection comprises an expanded end of an all-plastic pipe or of a plastic composite pipe; and such a connecting element.

Such pipe connections and connecting elements for this purpose are known in the prior art. The end of the pipe is fixed to the connecting element via a fixing sleeve arranged over the end of the pipe, through which the end of the pipe is pressed against the external contour of the support body provided with circumferential external ribs. Depending on how the fixing sleeve used is attached, a distinction is made between various types of connecting techniques. In sliding sleeve connections, also referred to as axial press-fit systems, the support body of the connecting element is inserted into an expanded end of a pipe and a sliding sleeve attached externally to the end of the pipe is press-fitted in an axial direction onto the end of the pipe with inserted support body of the connecting element by means of a specific sliding tool. Such an axial press-fitting system with a sliding sleeve is described in DE 101 30 858 A1, for example. The sliding sleeve described therein is made of an elastically deformable polymer material. The connecting element has a circumferential collar, which is encompassed by the sliding tool when the sliding sleeve is slid onto. In order to achieve an axial fixing of the sliding sleeve, the sliding sleeve is elastically attached on both sides of the circumferential external ribs to the expanded end of the pipe, thereby creating a type of form fit, which holds the sliding sleeve in its axial position in the sliding sleeve connection. What is viewed as a disadvantage of the sliding sleeve connection described in DE 101 30 858 A1, is that when axially press-fitting the sliding sleeve, there is the risk that the expanded end of the pipe is further displaced in the direction of the circumferential collar, thereby leading to a weakening of the axial fixing of the sliding sleeve. By this, the risk of disconnecting the pipe connection is increased.

SUMMARY OF THE INVENTION

Therefore, it is the object of the present invention to provide a connecting element and a pipe connection comprising the connecting element that overcome the disadvantages of the prior art. In particular, the connecting element according to the invention is intended to provide an increased stability of the pipe connection comprising it and the pipe connection of the present invention is intended to reduce the tendency to relative motion of the sliding sleeve on the expanded end of the pipe.

These and other objects of the present invention are solved by a connecting element having at least one support body provided with circumferential external ribs for press-fitting an expanded end of the pipe onto, and having at least one circumferential collar, wherein the connecting element between the circumferential collar and the nearest circumferential external rib to the circumferential collar further comprises a pre-stop for limiting the sliding onto of the expanded end of the pipe, and wherein the distance between the edge of the pre-stop facing the circumferential external ribs and the edge of the circumferential collar facing the pre-stop is 0.10 times to 0.30 times the length of the support body. These and other objects of the present invention are also solved by a pipe connection claim 11 between an expanded end of an all-plastic pipe or of a plastic composite pipe and a connecting element, including an expanded end of an all-plastic pipe or of a plastic composite pipe; and the above-described connecting element.

The circumferential collar may be connected with the pre-stop via a plurality of bridges or the pre-stop may be designed in a stepped arrangement to the circumferential collar as an integral component thereof.

The external diameter of the pre-stop may be 1.1 times to 1.5 times the external diameter of the circumferential external rib having the largest external diameter.

The distance between the pre-stop and the nearest circumferential external rib of which pre-stop may be 0.10 times to 0.50 times the length of the support body.

The width of the circumferential collar may equal 0.050 times to 0.20 times the length of the support body.

The external diameter of the circumferential collar may equal 1.1 times to 2.0 times the external diameter of the circumferential external ribs having the largest external diameter.

At least one of the circumferential external ribs may have a saw tooth-like cross section and at least one of the circumferential external ribs may have a substantially rectangular cross section.

The distance between the edges of two adjacent circumferential external ribs facing the collar may equal 0.10 times to 0.50 times the length of the support body.

The external diameter of each circumferential external rib independently may equal 1.03 times to 1.3 times the external diameter of the base area of the support body.

The length of the support body may equal 0.60 times to 2.0 times the external diameter of the circumferential external rib with the largest external diameter.

The pipe connection may include a sliding sleeve made of elastically deformable polymer material axially slid onto the expanded end.

The end of the sliding sleeve facing the circumferential collar may protrude beyond the edge of the pre-stop facing the circumferential external rib.

The ratio of the height of the pre-stop to the wall thickness of the pipe may range from 0.40 to 1.0 and preferably from 0.50 to 0.98.

The following may apply to the expansion ratio $R(exp)$ of the sliding sleeve connection: $0.05 < R(exp) = [D(max)/D(internal)] - 1 < 0.3$, wherein $D(max)$ stands for the maximum external diameter of the circumferential external ribs and $D(internal)$ stands for the internal diameter of the pipe.

The pipe may be an all-plastic pipe and the expansion ratio R(exp) of the sliding sleeve connection may range from 0.10 to 0.35, preferably from 0.15 to 0.25, or the pipe may be a metal-plastic composite pipe and the expansion ratio R(exp) of the sliding sleeve connection may range from 0.05 to 0.25, preferably from 0.10 to 0.20.

The internal surface of the sliding sleeve may have an average roughness value Ra in a range of 1 μm to half of the average wall thickness of the sliding sleeve.

The internal surface of the sliding sleeve may have a plurality of macroscopic irregularities the depth of which does not exceed half the average wall strength of the sliding sleeve.

According to the present invention, it has been found that the stability of the pipe connection can also be increased in that the fixing sleeve used therein is bent in the final connection towards the support body on the side of the support body facing the circumferential collar. According to the invention, this is achieved in that a pre-stop is provided between the circumferential collar and the nearest circumferential external rib to the latter. The pre-stop constitutes a limitation in sliding onto the expanded end of the pipe in an axial direction. This causes a hollow space between the pre-stop and the circumferential collar, which can spatially accommodate the section of the sliding sleeve bent towards the support body. The distance between the edge of the pre-stop facing the circumferential external ribs and the edge of the circumferential collar facing the pre-stop is 0.10 times to 0.30 times the length of the support body. A distance within this range has turned out to be sufficient for generating a bend of the fixing sleeve during the production of the pipe connection according to the present invention, while the stability of the connecting element is maintained.

Accordingly, the present invention provides a connecting element for producing a pipe connection between the connecting element and a plastic pipe or a metal-plastic composite pipe by using axial pressing technology, wherein the connecting element has at least one support body provided with circumferential external ribs for press-fitting an expanded end of the pipe onto, and comprises at least one circumferential collar, wherein the connecting element between the circumferential collar and the nearest circumferential external rib to said circumferential collar further comprises a pre-stop for limiting the sliding onto of the expanded end of the pipe, wherein the distance between the edge of the pre-stop facing the circumferential external ribs and the edge of the circumferential collar facing the pre-stop is 0.10 times to 0.30 times the length of the support body. Furthermore, the present invention provides a pipe connection between an expanded end of an all-plastic pipe or of a plastic composite pipe and a connecting element, wherein the pipe connection comprises an expanded end of an all-plastic pipe or of a plastic composite pipe; and such a connecting element.

The term "length of the support body", as used herein, means the distance between an open end of a support body of the connecting element and the edge of the circumferential collar facing the open end. Furthermore, the term "external diameter of the base area of the support body", as used herein, means the double distance between a longitudinal axis of a support body of the connecting element and the deepest point of the relevant support body between the pre-stop and the circumferential external rib adjacent to the latter.

It can be useful if the distance between the edge of the pre-stop facing the circumferential external ribs and the edge of the circumferential collar facing the pre-stop is 0.10 times to 0.30 times the length of the support body, in particular 0.12 times to 0.25 times the length of the support body and, preferably, 0.13 to 0.20 times the length of the support body.

It can also prove helpful if the circumferential collar is connected with the pre-stop via a plurality of bridges. Such connecting bridges between the circumferential collar and the pre-stop provide the connecting element with additional stability, as the forces acting on the circumferential collar during the axial press-fitting of the sliding sleeve, which the corresponding sliding tool engages, are partially deflected to the pre-stop as well. In alternative embodiments of the present invention an even higher stability can also be achieved by configuring the pre-stop in a stepped arrangement to the circumferential collar as an integral component thereof.

It might as well be favourable, if the external diameter of the pre-stop is 1.1 times to 1.5 times, preferably 1.15 times to 1.4 times and particularly preferred 1.2 times to 1.3 times the external diameter of the circumferential external rib with the largest diameter. With an external diameter of the pre-stop within the stated range, the pre-stop constitutes a sufficiently large obstacle for the pipe during axially sliding onto of the sliding sleeve. A pre-stop with too large an external diameter outside the stated range would mean that the sliding sleeve in the pipe connection could attach itself to the pre-stop, thus not increasing the stability of the pipe connection and possibly deteriorate it instead.

It can also be preferred if the distance between the pre-stop of the connecting element and the nearest circumferential external rib to the latter equals 0.10 to 0.50 times, particularly preferred 0.20 times to 0.36 times the length of the support body. With such a configuration of the distance between the pre-stop of the connecting element and a nearest circumferential external rib to the latter, a region of the support body is created in which the end of the pipe press-fitted onto the support body can partially accommodate the form of the bend of the sliding sleeve in the pipe connection according to the invention, thus further increasing the stability of the pipe connection according to the invention.

It can also be useful if the width of the circumferential collar equals 0.050 times to 0.20 times the length of the support body, in particular 0.060 times to 0.15 times the length of the support body and preferably 0.070 times to 0.11 times the length of the support body. A width of the circumferential collar offers sufficient force absorption when using the sliding sleeve tool with low material effort.

It can also be useful if the external diameter of the circumferential collar is 1.1 times to 2.0 times, in particular 1.1 times to 1.8 times, and preferably 1.2 times to 1.5 times the external diameter of the circumferential external rib with the largest external diameter. If the external diameter of the circumferential collar is within this range, the risk of the press-fit tool slipping off the circumferential collar during press-fitting is low, thus resulting in the resistance of the circumferential collar.

Furthermore, it can prove helpful if at least one of the circumferential external ribs of the supporting body has a saw tooth-like cross section and at least one of the circumferential external ribs has a substantially rectangular cross section. The presence of a rectangular sealing rib contributes to a secure sealing between the pipe and the connecting element in the pipe connection according to the invention, while a saw tooth-shaped circumferential external rib in the pipe connection according to the invention effectively prevents the end of the pipe slipping off from the support body of the connecting element. It is especially preferred in this context if at least one saw-tooth-shaped circumferential rib, in particular all saw-tooth-shaped circumferential ribs are arranged in such a way that the inclined side of the saw tooth points in the direction of the open end of the support body. The support body, beginning at the open end thereof, preferably has two circumferential external ribs with saw-tooth-like cross sections and a circumferential external rib with rectangular cross section. In alternative embodiments the support body, also beginning at the open end thereof, can also have a circumferential external rib with saw-tooth-like cross-section, two circumferential external ribs with rectangular cross section and again a circumferential external rib with saw-tooth-like cross section.

Likewise, it can be advantageous if the distance between the edges of two adjacent circumferential external ribs, measured from its edge facing the circumferential collar in each case, equals 0.10 times to 0.50 times, particularly preferred 0.20 times to 0.25 times the length of the support body. A distance between two adjacent circumferential external ribs within the stated range allows the circumferential external ribs of the connecting element to press into the end of the pipe press-fitted onto the pipe connection section, wherein the distance determines a desired distribution of a preferred number (in particular three or four) of circumferential external ribs on the support body of the connecting element.

It has also proven to be favourable if the external diameter of each independent circumferential external rib equals 1.03 times to 1.3 times the external diameter of the base area of the support body. If the external diameter of the circumferential external ribs with relation to the external diameter of the base area of the support body is within the stated range, sufficient tightness of the pipe connection according to the invention is ensured with low material consumption for the circumferential external ribs. In this regard, the external diameter of the circumferential external ribs is particularly preferred 1.05 times to 1.2 times the external diameter of the base area of the support body, in particular 1.07 times to 1.1 times the external diameter of the base area of the support body. The external diameter of a circumferential external rib with a saw-tooth-shaped cross section preferably corresponds to the external diameter of a circumferential external rib with rectangular cross section.

Likewise, it can be advantageous if the length of the support body is 0.60 times to 2.0 times, in particular 0.90 times to 1.8 times, and preferably 1.1 times to 1.5 times the external diameter of the circumferential external rib with the largest diameter. If the length of the support body is within the stated range, the connecting element has good resilience to bending stress with reasonable material effort.

It can also be useful if the width of at least one of the circumferential external ribs with a substantially rectangular cross-section is 0.01 to 0.08 times, particularly preferably 0.02 to 0.06 times, the length of the support body. If the width of the circumferential external ribs is within the stated range, the circumferential external ribs of the connecting element can slide far enough with sufficient sealing effect into the end of the pipe press-fitted onto the support body as to ensure a secure fit of the end of the pipe on the support body of the connecting element of the present invention.

It can also be helpful if the ratio of the height of the pre-stop over the base area of the support body to the wall thickness of the pipe ranges from 0.40 to 1.0, in particular from 0.50 to 0.98, and preferably from 0.60 to 0.96. A relative height of the pre-stop enables pipes with different wall thicknesses to be used in the pipe according to the invention.

With regard to the pipe connection according to the invention, it may be preferred if the pipe connection comprises a sliding sleeve made of elastically deformable polymer material axially slid onto the expanded end. Thereby, the bend of the sliding sleeve and accordingly the stability of the pipe connection of the present invention are further increased.

Furthermore, it may turn out to be helpful if the end of the sliding sleeve facing the circumferential collar protrudes beyond the edge of the pre-stop facing the circumferential external rib. This arrangement favours also the bend of the sliding sleeve and accordingly the stability of the pipe connection of the present invention.

Likewise, it can be preferred if the ratio of the height of the pre-stop to the wall thickness of the pipe ranges from 0.40 to 1.0, particularly from 0.50 to 0.98 and preferably from 0.60 to 0.96. A relative height of the pre-stop allows the use of pipes having different wall thicknesses in the pipe connection of the present invention.

It can be further helpful if the following applies to the expansion ratio R(exp) of the pipe connection:

$$0.05 < R(exp) = [D(max)/D(internal)] - 1 < 0.35$$

wherein D(max) stands for the maximum external diameter of the circumferential external ribs and D(internal) for the internal diameter of the pipe. If plastic pipes are used, an expansion ratio in this range is large enough to ensure sufficient tightness of the connection. In addition, if metal-plastic composite pipes are used, the expansion ratio is sufficiently small to prevent any damage of the metal layer of the MCV pipe due to a too strong local strain. This makes the connecting element universally usable for all pipe wall strengths with the given external diameter of the used pipe. Thereby, the number of stockpiled fittings for the plumber is reduced and the danger of confusion in the selection of fittings is decreased.

When using a plastic pipe, it is advantageous according to the invention if the expansion ratio R(exp) of the pipe connection according to the invention ranges from 0.10 to 0.35, particularly preferably from 0.15 to 0.25. A sufficiently tight pipe connection is achieved if the expansion ratio of the pipe connection according to the invention is within this range when using a plastic pipe, wherein no excessive effort is required when expanding the pipe. When using a metal-plastic composite pipe, it has proved advantageous with regard to an improved tightness of the pipe connection according to the invention and an integrity of the metal layer contained in the pipe if the expansion ratio R(exp) of the pipe connection ranges from 0.05 to 0.25 and particularly preferably from 0.10 to 0.20.

It is also preferred if the internal surface of the sliding sleeve has an average roughness value $R_a$ ranging from 1 μm to half of the average wall thickness of the sliding sleeve. An increased roughness on the internal surface of the sliding sleeve, compared with the smooth internal surfaces of sliding sleeves for axial slid-onto systems previously used according to the prior art, leads to a reduction in the force needing to be exerted for axially-sliding the corresponding sliding sleeve onto the expanded end of the pipe with inserted support body. At the same time, an internal surface of the sliding sleeve with increased roughness is accompanied by a lower tendency to relative motion of the sliding sleeve on the expanded end of the pipe, in particular in the event of thermal cycling. These two significant advantages of the rough internal surface of the sliding sleeve are to be observed as of an average roughness value $R_a$ of the internal surface of the sliding sleeve of 1 μm. If this average roughness value $R_a$ of the internal surface of the sliding sleeve exceeds half of the average wall thickness of the sliding sleeve, it may occur that the sliding sleeve does not exert sufficient pressure on the expanded end of the pipe with the inserted support body of the connecting element. This could lead to a less tight pipe connection. It can be advantageous in this regard if the internal surface of the sliding sleeve has an average roughness value $R_a$ ranging from 3 µm to 1000 µm, preferably from 5 µm to 50 µm. The stated ranges of the average roughness value achieve a particularly well-balanced ratio between reduced force to be exerted for press-fitting and sufficient stability of the resulting pipe connection according to the invention. The term "average roughness value" (designated by the symbol "$R_a$") of a surface, as used herein, means the arithmetic average or mean of the amount deviation of all measuring points on the surface from the centre line of the surface. Such effects can be alternatively or additionally increased or achieved if the internal surface of the sliding sleeve has a plurality of macroscopic irregularities, the depth of which does not exceed half of the medium wall thickness of the sliding sleeve.

Likewise, it can be advantageous according to the invention if the internal surface of the sliding sleeve has an average roughness depth $R_z$ ranging from 5 µm to half of the average wall thickness of the sliding sleeve, preferably ranging from 10 µm to 2000 µm. The stated ranges of the average roughness depth result in a well-balanced ratio between reduced force to be exerted for press-fitting and sufficient intrinsic elasticity of the sliding sleeve. The term "average roughness depth" (designated by the symbol "$R_z$") of a surface means the roughness depth according to DIN EN ISO 4287/4288.

According to the present invention, preferred materials for the connecting element of the present invention are polymeric materials, such as, for example, polypropylene and glass fibre reinforced polypropylene, polyamides and glass fibre reinforced polyamides, temperature-resistant thermoplastics such as polyphenyl sulfone (PPSU), polyvinylidene fluoride (PVDF), polyether sulfone (PES), polyphenylene sulfide (PPS), polysulfone (PSU), acrylonitrile-butadiene-styrene (ABS) and polyester carbonate (PESC), as well as copolymers and blends of such polymers, wherein said polymer materials can also be used fibre reinforced, in particular glass fibre reinforced, as well as metallic materials, such as, for example, brass, in particular Ecobrass®, red brass and stainless steel. Temperature-resistant thermoplastics, such as polyphenyl sulfone and polyvinyl fluoride, are particularly preferred for producing the connecting element used according to the invention. The term "temperature-resistant thermoplastics", as used herein, relates to the heat resistance and thermostability of this material group and designates thermoplastic polymer materials with a heat resistance at temperatures of at least 150° C. The upper limit of the temperature at which such temperature-resistant plastic can be used depends on the material used, wherein the usability of such polymer materials ends at a maximum of 260° C.

According to the present invention, used as plastic pipes are all-plastic pipes, preferably made of polyethylene (PE, in particular PE 100 and PE-RT, cross-linked polyethylene (PE-X, in particular PE-Xa, PE-Xb and PE-Xc), polypropylene (in particular statistical polypropylene PP-R) and polybutylene (PB); as well as plastic composite pipes, preferably with layers of polyethylene (PE, in particular PE 100 and PE-RT), cross-linked polyethylene (PE-X, in particular PE-Xa, PE-Xb and PE-Xc), polypropylene (in particular statistical polypropylene PP-R) and/or polybutylene (PB). An additional layer of ethylene vinyl alcohol copolymer (EVOH) may also be provided as oxygen barrier layer. According to the present invention, metal-plastic composite pipes (MCV pipes) preferably comprise layers of polyethylene (PE, in particular PE 100 and PE-RT), cross-linked polyethylene (PE-X, in particular PE-Xa, PE-Xb and PE-Xc), polypropylene (in particular statistical polypropylene PP-R) and/or polybutylene (PB) and at least one layer of metals, preferably aluminium. When using plastic composite pipes and MCV pipes, bonding agent layers may also be inserted between individual layers. According to the present invention, all pipes in a pipe connection can be constructed identically or one or more of the pipes can have different structures. In addition, the pipes can also be fibre reinforced according to the present invention. The fibre reinforcement of the line pipes can be present in individual or all pipes, over the entire length of the pipe or only in sections as well. With regard to the plastic pipe or the metal-plastic composite pipe of the pipe connection according to the present invention, it is particularly preferable if at least one layer of the respective pipe includes cross-linked polyethylene (PE-X, in particular PE-Xa, PE-Xb and PE-Xc). The material "cross-linked polyethylene" is a material that has a shape memory, a so-called "memory effect". Such a memory effect means that the cross-linked polyethylene tries to return to its original shape after any change in its external geometry. During pipe expansion, this causes any pipe including PE-X to try to return to the original internal pipe diameter before the expansion. As a support body of a connecting element is inserted in the expanded end of the pipe after expansion, the memory effect when using a pipe including at least one layer of cross-linked polyethylene leads to a particularly high tightness of the pipe connection according to the invention.

The connecting element according to the present invention of the pipe connection according to the present invention can be a threaded moulded part or a threadless moulded part, i.e. a connecting element with no thread. This in particular includes connecting pieces, connection brackets, multiple distributors, t-pieces, wall t-pieces, wall brackets, system transitions, transition pieces, angled transition pieces, none of which have a thread. Accordingly, the term "threaded moulded part" refers to a connecting element having at least one threaded moulded part. This in particular includes connecting pieces, connection brackets, multiple distributors, t-pieces, wall t-pieces, wall brackets, system transitions, transition pieces and angled transition pieces, all of which have at least one internal and/or external thread.

According to the invention, the preferred materials for the sliding sleeve are those materials to which reference is made with relation to the connecting element of the pipe connection according to the present invention. Temperature-resistant plastics and in particular polyphenyl sulfone and polyvinylidene fluoride are particularly preferred as materials for the sliding sleeve. Cross-linked polyethylene (PE-X, in particular PE-Xa, PE-Xb and PE-Xc) is also particularly preferred as material for the sliding sleeve.

The pipe connection according to the present invention is in particular used in piping and connection systems in drinking water installation, in sprinkler systems, in radiator connections, in concrete core temperature controls as well as in surface heating or surface cooling systems.

BRIEF DESCRIPTION OF THE SEVERAL VIEWS OF THE DRAWINGS

The following is intended to explain the invention in detail with reference to the embodiments shown in the figures. The figures show in.

DETAILED DESCRIPTION OF THE INVENTION

Figure 1:
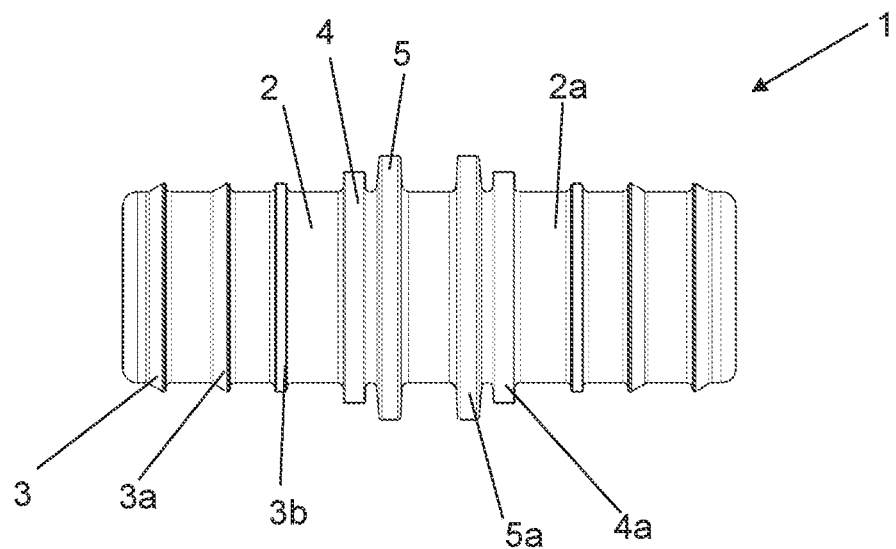
FIG. 1 a side view of a connecting element for use in a pipe connection according to an embodiment of the present invention.

FIG. 1 shows a side view of a connecting element 1 according to an embodiment of the present invention. The connecting element 1 is a connecting piece having two support bodies 2, 2a, wherein each of the support bodies 2, 2a in the embodiment shown in FIG. 1 has three circumferential external ribs 3, 3a, 3b. Said three circumferential external ribs 3, 3a, 3b extend in an axial direction, beginning at the open end of the connecting element 1, and are arranged in such a way that two consecutive saw-tooth-shaped circumferential external ribs 3, 3a are followed by a circumferential external rib 3b with a substantially rectangular cross section. A pre-stop 4, 4a connects with each of the two support bodies 2, 2a. Furthermore, the connecting element 1 has a circumferential collar 5, 5a for each support body 2, 2a, which closes off the respective support body 2, 2a.

The geometry of the connecting element 1 according to the present invention and a pipe connection 6 according to the present invention which comprises the connecting element 1 are described in detail in the following with reference to the left support body 2 in FIG. 1, wherein it is understood that such explanations also apply to the right support body 2a in FIG. 1 as well as to further existing support bodies possibly present in other embodiments accordingly.

Figure 2:
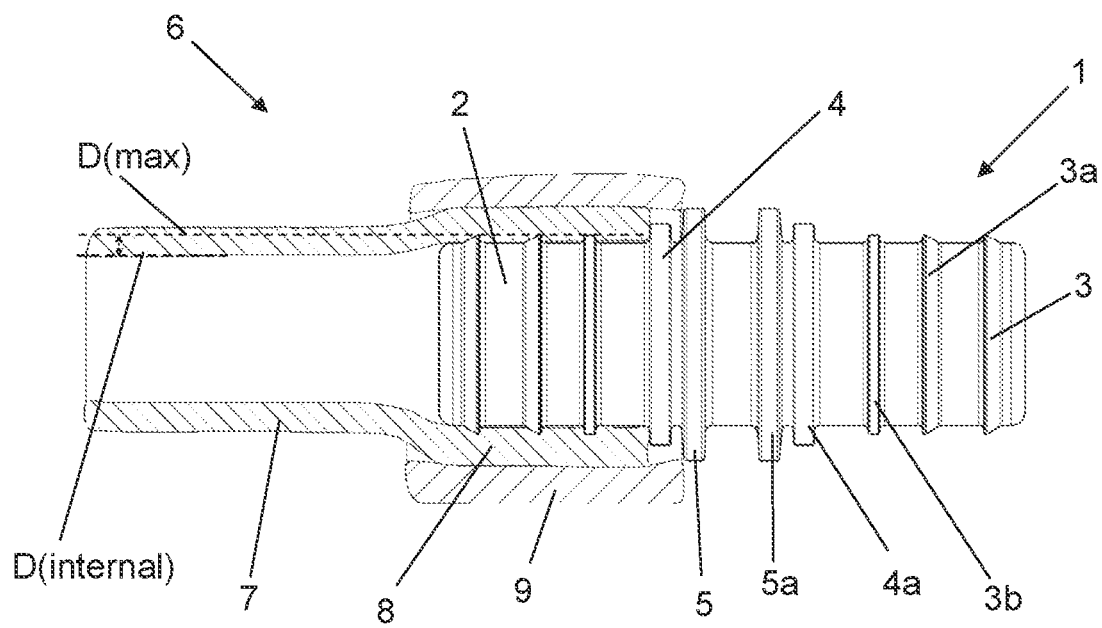
FIG. 2 is a side view of a pipe connection according to an embodiment of the present invention, in which a plastic pipe is slid onto a support body of the connecting element illustrated in FIG. 1, wherein the end of the pipe and the sliding sleeve are shown in section.

FIG. 2 shows a side view of an embodiment of a pipe connection 6 according to the invention comprising the connecting element 1 shown in FIG. 1. A sliding sleeve 9, shown in a sectional view in FIG. 2, is slid therein beyond the expanded end of the pipe 8 of the all-plastic or metal-plastic composite pipe 7 slid onto support body 2 and extending to the pre-stop 4 as a maximum, said pipe 7 also being shown in sectional view in FIG. 2, in the direction of the circumferential collar 5 of the connecting element. As the pre-stop 4 is spaced from the circumferential collar 5, a hollow space is formed between the pre-stop 4 and the circumferential collar 5. Said hollow space allows a bending of the section of the sliding sleeve 9 protruding beyond the end of the pipe 8 in the direction of the support body 2. This results in a mechanical fixing of the sliding sleeve 9 and thus an increased stability of the pipe connection 6 according to the present invention. In the embodiment of the connecting element 1 according to the present invention shown in FIG. 1 the distance between the circumferential collar 5 of the connecting element 1 according to the present invention and the associated pre-stop 4 is 0.20 times the length of the support body 2. In alternative embodiments of the connecting piece 1 according to the present invention the distance between the pre-stop 4 and the circumferential collar 5 can equal 0.10 times to 0.30 times the length of the support body 2. As used herein, the term "length of the support body 2" in each case refers to the distance between the open end of the support body 2 of the connecting element 1 and the circumferential collar 5. The external diameter of the pre-stop 4 in the shown embodiment of the connecting element 1 according to the present invention is 1.25 times the external diameter of the circumferential external ribs 3, 3a, 3b having the largest external diameter. In alternative embodiments the external diameter of the pre-stop 4 can equal 1.1 times to 1.5 times the external diameter of the circumferential external rib 3, 3a, 3b with the largest external diameter. If the external diameter of the pre-stop 4 is within the stated range, the pre-stop 4 constitutes a sufficiently large obstacle for the expanded end of the pipe 8 without impairing the stability of the pipe connection 6 according to the present invention. In the embodiment shown the ratio of the height of the pre-stop 4 over the base area of the support body 2 to the wall thickness of the all-plastic or metal-plastic composite pipe 7 is 0.75 and preferably ranges from 0.40 to 1.0.

In the embodiment of the connecting element 1 according to the present invention shown in FIG. 1 and FIG. 2 the distance between pre-stop 4 of the connecting element 1 according to the present invention and the nearest circumferential external rib 3b to the latter is 0.18 times the length of the support body 2. This allows the sliding sleeve 9 in the pipe connection 6 according to the present invention to be pushed more strongly into the expanded end of the pipe 8 of the all-plastic or metal-plastic composite pipe slid onto the support body 2 than via the section at which the circumferential external ribs 3, 3a, 3b are arranged (FIG. 2). This results in further increased stability of the pipe connection 6 according to the present invention. In alternative embodiments of the connecting piece 1 according to the present invention the distance between the pre-stop 4 and the nearest circumferential external rib 3b to the latter can be 0.10 times to 0.50 times the length of the support body 2. The wall thickness or width of the circumferential collar 5 equals 0.11 times the length of the support body 2, wherein in alternative embodiments of the connecting piece 1 the width of the circumferential collar 5 can be 0.050 times to 0.20 times the length of the support body.

The external diameter of the circumferential collar 5 is 1.4 times the external diameter of the circumferential external ribs 3, 3a, 3b, which have the same maximum external diameter in the embodiment shown. The risk of the press-fit tool slipping off the circumferential collar 5 during pressing is thus low, thereby resulting in the resistance of the circumferential collar 5. In alternative embodiments of the connecting piece 1 of the present invention the external diameter of the circumferential collar 5 is 1.0 times to 2.0 times the external diameter of the circumferential external rib 3, 3a, 3b with the largest external diameter. The length of the support body 2 is 1.4 times the external diameter of the circumferential external ribs 3, 3a, 3b, wherein in alternative embodiments of the connecting piece 1 according to the present invention the length of the support body 2 is 0.60 times to 2.0 times the external diameter of the circumferential external rib 3, 3a, 3b with the largest external diameter. The connecting element 1 according to the present invention thus has good resilience to bending stress with reasonable material expense. The external diameter of the circumferential external ribs 3, 3a, 3b measures 1.1 times the external diameter of the base area of the support body 2. This allows the circumferential external ribs 3, 3a, 3b of the connecting element 1 according to the present invention in a pipe connection 6 according to the present invention to be pushed far enough into the end of the pipe 8 slid onto the support body 2 to ensure a secure and tight fit of the end of the pipe 8 on the support body 2 with reasonable material expense. In alternative embodiments of the connecting element 1 according to the invention the maximum external diameter of the circumferential external ribs 3, 3a, 3b is 1.03 to 1.3 times the external diameter of the base area of the support body 2. Here, the circumferential external ribs 3, 3a, 3b can have differing external diameters, although it is preferred that the circumferential external ribs 3, 3a, 3b have the same external diameter. The distance between the two saw-tooth-shaped circumferential external ribs 3, 3a is 0.25 times the length of the support body 2, while the distance between the saw-tooth-shaped circumferential external rib 3a and circumferential external rib 3b with a substantially rectangular cross-section is 0.2 times the length of the support body 2, always measured from the edges facing the circumferential collar. This allows the circumferential external ribs 3, 3a, 3b of the connecting element 1 according to the present invention to be pressed far enough into the end of the pipe 8 press-fitted onto the support body 2 to ensure a securely fitting seal. However, it is preferred if the three circumferential external ribs 3, 3a, 3b are distributed as equally as possible on the corresponding section of the support body 2. These advantages allow the distance between two circumferential external ribs 3, 3a, 3b in alternative embodiments of the connecting element 1, always measured from the edges facing the circumferential collar, to equal 0.10 times to 0.50 times the length of the supporting body 2 as well.

The connecting element 1 according to the present invention shown in FIG. 1 is designed in mirror symmetry to a level running down the middle between the two circumferential collars 5, 5a and perpendicularly to the axis of the connecting element 1. Accordingly, the comments made with reference to the support body 2 thus apply analogously to support body 2a.

The connecting element 1 according to the present invention in the embodiment shown in FIG. 1 is a component made of polyphenyl sulfone (PPSU). Also usable in alternative embodiments of the connecting element 1 according to the present invention are polypropylene and glass fibre reinforced polypropylene, polyamides and glass fibre reinforced polyamides, polyvinylidene fluoride (PVDF), polyether sulfone (PES), polysulfone (PSU), polyphenyl sulphide (PPS), acrylonitrile-butadiene-styrene copolymer (ABS) and polyester carbonate (PESC), as well as copolymers and blends of said polymers, wherein said polymer materials can also be used fibre reinforced, in particular glass fibre reinforced, or metallic materials, such as brass, in particular Ecobrass®, red brass and stainless steel.

Pipe 7 according to this embodiment of the present invention is an all-plastic pipe 7 made of cross-linked polyethylene (PE-X, in particular PE-Xa, PE-Xb and PE-Xc). As an alternative, all-plastic pipes made of other materials as well as plastic composite pipes and metal-plastic composite pipe can also be used as pipe 7 in other embodiments of the present invention. Preferred, however, when using plastic composite pipes and metal-plastic composite pipes is a layer of cross-linked polyethylene (PE-X), in particular PE-Xa, PE-Xb and PE-Xc as the layer facing the internal diameter of pipe 7.

A further pipe 7 can be connected to the second support body 2a according to the invention by a pipe connection 6 according to the invention. The further pipe 7 can have an identical or different construction to the pipe 7 of the support body 2.

The sliding sleeve 9 used to fix the expanded end of the pipe 8 onto the support body 2 is a sleeve made of cross-linked polyethylene (PE-X, in particular PE-Xa, PE-Xb and PE-Xc) in the embodiment shown in FIG. 1, which has a constant cross section over its entire length. Alternatively, sliding sleeves 9 made of other materials, in particular polyvinylidene fluoride (PVDF), can also be advantageously used. The sliding sleeve 9 in this embodiment has an internal surface with an average roughness value $R_a$ in a range of 4 µm, wherein the roughness of the internal surface in alternative embodiments of the sliding sleeve 9 preferably ranges from 1 µm to half of the average wall thickness of the sliding sleeve 9. An increased roughness on the internal surface of the sliding sleeve 9, compared with sliding sleeves with smooth internal surfaces, leads to a reduction in the force needing to be exerted for axially sliding the corresponding sliding sleeve 9 onto the expanded end of the pipe 8 with inserted support body 2. At the same time, an internal surface of the sliding sleeve 9 with increased roughness has a lower tendency to relative motion of the sliding sleeve 9 on the expanded end of the pipe 8, in particular in the event of thermal cycling.

In order to generate the pipe connection 6 according to the present invention, the sliding sleeve 9 is initially slid over the end 8 of the plastic pipe 7. An expansion tool is then inserted in the end 8 of the plastic pipe 7 and the plastic pipe 7 is expanded at one end 8 by means of an expansion tool. Thereupon, the support body 2 of the connecting element 1 according to the present invention is inserted in the expanded end 8 of the plastic pipe 7 until the expanded end 8 of the plastic pipe 7 is approximately attached to the pre-stop 4. The expanded end 8 of the plastic pipe 7 contracts due to the memory effect of the raw material, wherein the plastic material of the plastic pipe 7 presses into the external contour of the support body 2 of the connecting element 1 according to the present invention. The sliding sleeve 9 is then slid in an axial direction onto the expanded end 8 of the plastic pipe 7 with inserted support body 2 by a suitable press-fit tool in such a way that the expanded end 8 of the plastic pipe 7 is fixed on the support body 2. Further plastic pipes 7 or metal-plastic composite pipes 7 may now be connected in the same way to further support bodies 2a, thereby forming a pipe connection 6 according to the present invention.

In the embodiment shown in FIG. 2, the expansion ratio is approximately 0.25. This value is particularly preferred for a pipe connection 6 between a connecting element 1 and an all-plastic pipe 7, while a value of approximately 0.15 is particularly preferred for a connection between a connecting element 1 according to the present invention and a metal-plastic composite pipe 2.

Figure 3:
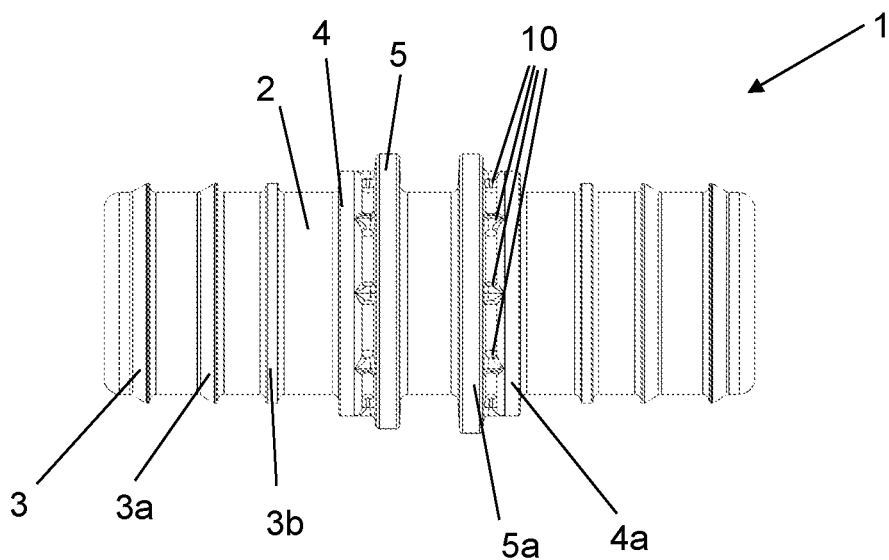
FIG. 3 is a side view of a connecting element for use in a pipe connection according to a further embodiment of the present invention.

In turn, FIG. 3 shows a side view of a further preferred embodiment of a connecting element 1 according to the present invention to form a pipe connection 6 according to the present invention. The connecting element of the present invention according to FIG. 3 differs from the connecting element 1 shown in FIG. 1 merely due to the fact that the two pre-stops 4, 4a are each connected with the associated circumferential collar 5, 5a via bridges 10 formed thereon in one-piece. This results in a higher mechanical stability of the connecting element 1 according to the present invention. With regard to further properties of the connecting element 1 according to the present invention, as well as of the pipe connection 6 according to the present invention formed therewith, the comments on FIG. 1 and FIG. 2 also apply to the connecting element 1 according to FIG. 3.

Figure 4:
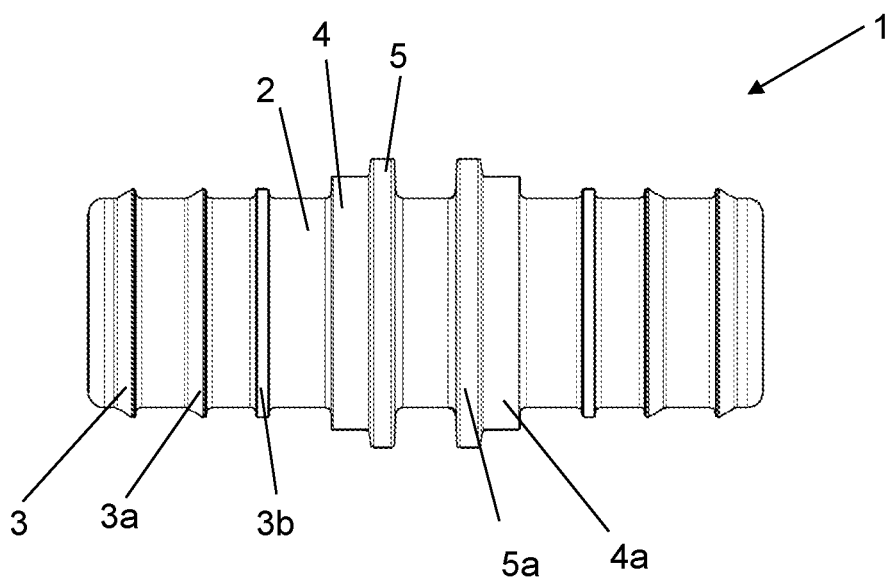
FIG. 4 is a side view of a connecting element for use in a pipe connection according to a further embodiment of the present invention.

FIG. 4 shows a side view of a connecting element 1 according to the present invention for forming an pipe 6 according to a further preferred embodiment of the present invention. The connecting element of the present invention according to FIG. 4 differs from the connecting element 1 of the present invention shown in FIG. 1 solely by the fact that each pre-stop 4, 4a is configured attached to the associated circumferential collar 5, 5a. The respective pre-stop 4, 4a thus forms an integral component of the associated circumferential collar 5, 5a. In this embodiment the pre-stop 4, 4a and the associated circumferential collar 5, 5a of a supporting body form a two-stage stepped arrangement. In this manner, it is achieved a higher mechanical stability of the connecting element 1 of the present invention. With regard to further properties of the connecting element 1 of the present invention, as well as of the pipe connection 6 of the invention designed therewith, the comments on FIG. 1 and FIG. 2 also apply to the connecting element 1 according to FIG. 4.

The connecting element 1 of the pipe connection 6 according to the present invention in the embodiments shown in FIGS. 1-4 is a pipe connector with two pipe connection sections or support bodies. Alternatively, the connecting element 3 according to the present invention can be configured as a connecting piece, connection bracket, multiple distributor, t-piece, wall t-piece, wall bracket, system transition, transition piece and angled transition piece, each possibly designed with at least one internal and/or external thread or threadless.

The present invention has been described in detail with reference to the embodiments of the present invention shown in the figures. It is understood that the present invention is not limited to the embodiments shown, but that the scope of the present invention results from the attached claims.

The invention claimed is:

1. A pipe connection between an expanded end of an all-plastic pipe or of a metal-plastic composite pipe and a connecting element, comprising: an expanded end of an all-plastic pipe or of a metal-plastic composite pipe; a connecting element connected to the expanded end of an all-plastic pipe or of a metal-plastic composite pipe; and a sliding sleeve made of elastically deformable polymer material axially slid onto the expanded end of the all-plastic pipe or of a metal-plastic composite pipe, wherein the connection element comprises:

a polymeric material, has at least one support body provided with circumferential external ribs, the at least one support body having a first end onto which the expanded end of the pipe is press-fit, and comprises at least one circumferential collar, wherein the connecting element between the at least one circumferential collar and the nearest circumferential external rib to the at least one circumferential collar further comprises a pre-stop limiting the expanded end of the pipe from sliding past the pre-stop toward the circumferential collar when the connecting element is inserted into the expanded end of the pipe, wherein a distance between an edge of the pre-stop facing the circumferential external ribs and an edge of the at least one circumferential collar facing the pre-stop is 0.10 times to 0.30 times a length of the at least one support body, the length of the at least one support body being defined as a distance between the first end of the at least one support body of the connecting element and the edge of the circumferential collar facing the open end, and wherein a section of the sliding sleeve protrudes beyond the end of the all-plastic pipe or of a metal-plastic composite pipe in towards the support body but without touching the pre-stop.

2. The pipe connection according to claim 1, wherein an end of the sliding sleeve facing the at least one circumferential collar protrudes beyond the edge of the pre-stop facing the circumferential external rib.

3. The pipe connection according to claim 1, wherein a ratio of a height of the pre-stop to a wall thickness of the pipe ranges from 0.40 to 1.0.

4. The pipe connection according to claim 1, wherein the following applies to an expansion ratio R(exp) of the sliding sleeve connection:

$$0.05 < R(exp) = [D(max)/D(internal)] - 1 < 0.35$$

wherein D(max) stands for a maximum external diameter of the circumferential external ribs and D(internal) stands for an internal diameter of the pipe.

5. The pipe connection according to claim 4, wherein the pipe is an all-plastic pipe and the expansion ratio R(exp) of the sliding sleeve connection ranges from 0.10 to 0.35, or the pipe is a metal-plastic composite pipe and the expansion ratio R(exp) of the sliding sleeve connection ranges from 0.05 to 0.25.

6. The pipe connection according to claim 1, wherein an internal surface of the sliding sleeve has an average roughness value Ra in a range of 1 μm to half of an average wall thickness of the sliding sleeve.

7. The pipe connection according to claim 1, wherein an internal surface of the sliding sleeve has a plurality of macroscopic irregularities a depth of which does not exceed half an average wall strength of the sliding sleeve.

8. The pipe connection according to claim 1, wherein an external diameter of a base area of the at least one support body between the pre-stop and the nearest circumferential external rib to the pre-stop is constant.

\* \* \* \* \*